United States Patent
Jha et al.

(10) Patent No.: US 12,468,945 B2
(45) Date of Patent: Nov. 11, 2025

(54) METHOD AND SYSTEM FOR PERFORMING NOISE REMOVAL AND KNOWLEDGE EXTRACTION TO IMPROVE PREDICTION MODEL PERFORMANCE

(71) Applicant: Dell Products L.P., Round Rock, TX (US)

(72) Inventors: Saurabh Jha, Austin, TX (US); Kuruba Ajay Kumar, Anantapur (IN)

(73) Assignee: DELL PRODUCTS L.P., Round Rock, TX (US)

( * ) Notice: Subject to any disclaimer, the term of this patent is extended or adjusted under 35 U.S.C. 154(b) by 593 days.

(21) Appl. No.: 17/972,257

(22) Filed: Oct. 24, 2022

(65) Prior Publication Data

US 2024/0135163 A1 Apr. 25, 2024
US 2024/0232608 A9 Jul. 11, 2024

(51) Int. Cl.
*G06F 17/00* (2019.01)
*G06N 3/08* (2023.01)
*G06N 5/022* (2023.01)

(52) U.S. Cl.
CPC .............. *G06N 3/08* (2013.01); *G06N 5/022* (2013.01)

(58) Field of Classification Search
CPC ................................. G06N 3/08; G06N 5/022
See application file for complete search history.

(56) References Cited

U.S. PATENT DOCUMENTS

| | | | | |
|---|---|---|---|---|
| 11,995,671 B1* | 5/2024 | Jordan | ............... | G06Q 30/0645 |
| 12,012,110 B1* | 6/2024 | Naoom | ................... | H04W 4/44 |
| 2004/0148241 A1* | 7/2004 | Qi | .......................... | G06Q 40/06 |
| | | | | 705/36 R |
| 2018/0248904 A1* | 8/2018 | Villella | ................... | G06N 3/044 |
| 2019/0005421 A1* | 1/2019 | Hammel | ........... | G06Q 10/06393 |
| 2020/0210520 A1* | 7/2020 | Akyamac | .............. | G06F 40/177 |
| 2022/0222608 A1* | 7/2022 | Lee | ................ | G06Q 10/063118 |
| 2023/0145448 A1* | 5/2023 | Huber | .................. | G05B 23/024 |
| | | | | 700/275 |
| 2023/0419098 A1* | 12/2023 | Ravula | ...................... | G06N 3/08 |
| 2024/0152771 A1* | 5/2024 | Qin | .......................... | G06N 5/02 |
| 2024/0242083 A1* | 7/2024 | Wolf | ......................... | G06N 3/09 |
| 2024/0330682 A1* | 10/2024 | Jandial | ................... | G06N 3/045 |

OTHER PUBLICATIONS

"Borisov et al, Deep Neural Networks and Tabular Data: A Survey, Feb. 2022, IEEE, 21 Pages" (Year: 2022).*
"Guo et al., TabGNN: Multiplex Graph Neural Network for Tabular Data Prediction, 2021, Department of Electronic Engineering, Tsinghua University, China, 10 pages" (Year: 2021).*

* cited by examiner

*Primary Examiner* — Mohammed H Zuberi
(74) *Attorney, Agent, or Firm* — Chamberlain, Hrdlicka, White, Williams & Aughtry; Aly Z. Dossa

(57) ABSTRACT

Techniques described herein relate to a method for performing knowledge extraction and noise removal for prediction models. The method includes obtaining, by a prediction system, live tabular data; in response to obtaining live tabular data: performing data preprocessing on the live tabular data to generate processed live tabular data; generating a knowledge vector based on the processed live tabular data using a dimensionality reduction model and a tabular attention model; generating a prediction using a prediction model and the knowledge vector; and providing the prediction to a client; wherein the client performs prediction processing using the prediction.

20 Claims, 6 Drawing Sheets

METHOD AND SYSTEM FOR PERFORMING NOISE REMOVAL AND KNOWLEDGE EXTRACTION TO IMPROVE PREDICTION MODEL PERFORMANCE

BACKGROUND

Business organizations may lease products to customers. The leases may be associated with particular lease periods, after which the customers may perform end-of-lease (EOL) actions. Users associated with the business organization may desire to predict the EOL actions performed by the customers. Computing devices may include prediction models that predict EOL actions of customers.

SUMMARY

In general, certain embodiments described herein relate to a method for performing knowledge extraction and noise removal for prediction models. The method may include obtaining, by a prediction system, live tabular data; in response to obtaining live tabular data: performing data preprocessing on the live tabular data to generate processed live tabular data; generating a knowledge vector based on the processed live tabular data using a dimensionality reduction model and a tabular attention model; generating a prediction using a prediction model and the knowledge vector; and providing the prediction to a client; wherein the client performs prediction processing using the prediction.

In general, certain embodiments described herein relate to a system for performing knowledge extraction and noise removal for prediction models. The system includes a client and a prediction system. The prediction system includes a processor and memory, and is programmed to obtain live tabular data; in response to obtaining live tabular data: perform data preprocessing on the live tabular data to generate processed live tabular data; generate a knowledge vector based on the processed live tabular data using a dimensionality reduction model and a tabular attention model; generate a prediction using a prediction model and the knowledge vector; and provide the prediction to the client; wherein the client performs prediction processing using the prediction.

In general, certain embodiments described herein relate to a non-transitory computer readable medium that includes computer readable program code, which when executed by a computer processor enables the computer processor to perform a method for performing knowledge extraction and noise removal for prediction models. The method may include obtaining, by a prediction system, live tabular data; in response to obtaining live tabular data: performing data preprocessing on the live tabular data to generate processed live tabular data; generating a knowledge vector based on the processed live tabular data using a dimensionality reduction model and a tabular attention model; generating a prediction using a prediction model and the knowledge vector; and providing the prediction to a client; wherein the client performs prediction processing using the prediction.

Other aspects of the embodiments disclosed herein will be apparent from the following description and the appended claims.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example and are not meant to limit the scope of the claims.

DETAILED DESCRIPTION

Figure 1:
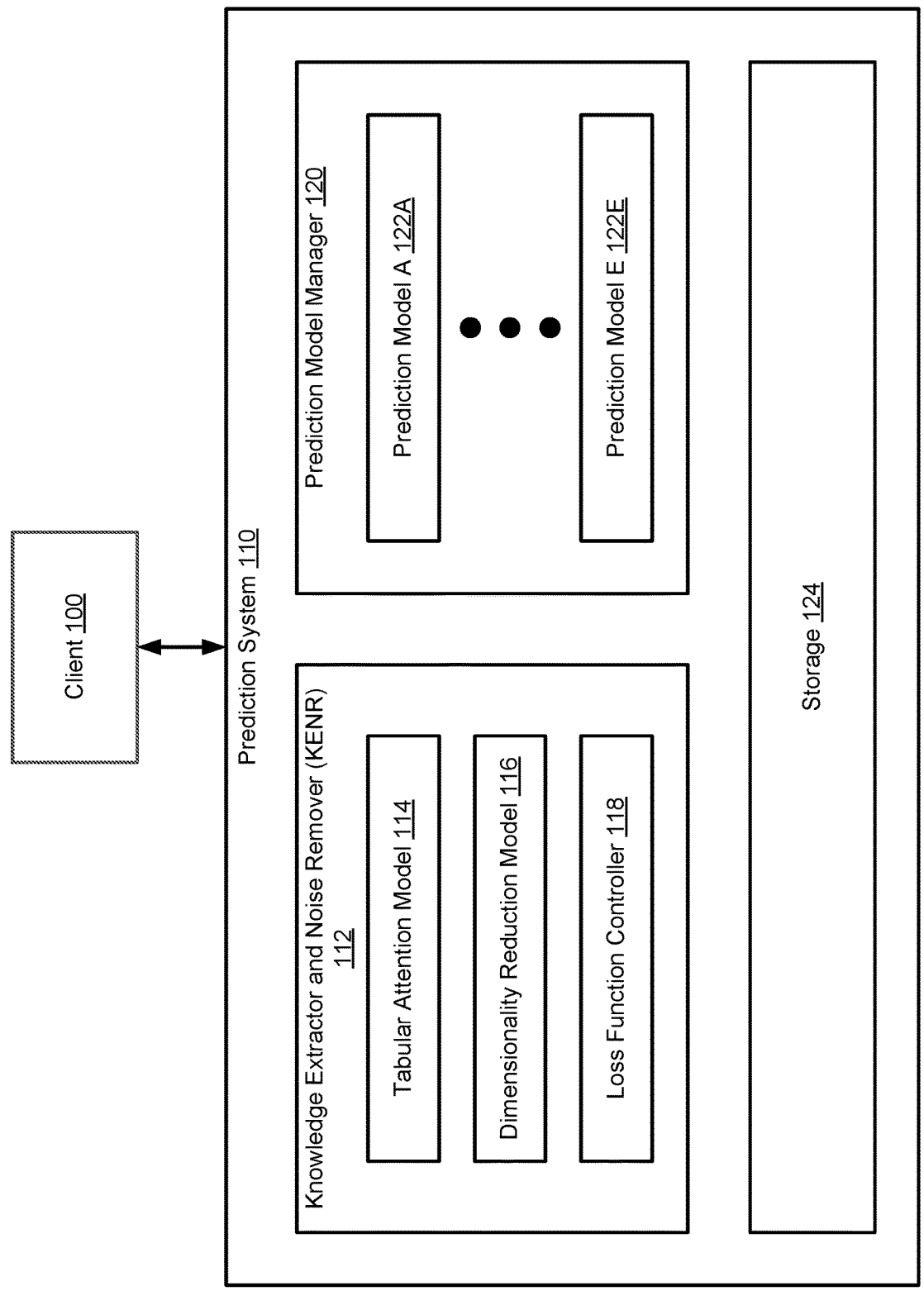
FIG. 1 shows a diagram of a system in accordance with one or more embodiments disclosed herein.

Specific embodiments will now be described with reference to the accompanying figures. In the following description, numerous details are set forth as examples of the embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as a and a second element labeled as N. This labeling convention means that the data structure may include any number of the elements. A second data structure, also labeled as A to N, may also include any number of elements. The number of elements of the first data structure and the number of elements of the second data structure may be the same or different.

In general embodiments disclosed herein relate to methods, systems, and non-transitory computer readable mediums for performing knowledge extraction and noise removal of tabular data to improve prediction model performance.

In one or more embodiments, business organizations may lease products to customers. The products may include any leasable products (e.g., laptops, servers, monitors, etc.)

without departing from embodiments disclosed herein. The leases may be associated with particular lease periods, after which the customers may perform any number of end-of-lease (EOL) actions. A customer may perform a disposal type associated with the product that includes renewing the lease on the product (e.g., a renewal), buying the product (e.g., a sold in place disposal type), returning the product (e.g., a give in place disposal type), and returning the product to the lease market (e.g., a remarketing disposal type). The EOL disposal types may be associated with a significant portion of the organizations business. In order to effectively decide on and implement business strategies associated with the leased products, the organization may desire to predict EOL information associated with the leased products. However, large organizations may include thousands of customers that lease products, with each customer potentially leasing thousands of products from the organization. The training data and live data required to train prediction models and generate predictions associated with customer EOL actions may be in the terabytes in size. Such sized data may be referred to as tabular data or big data. Traditional prediction models may not be capable of accurately or efficiently being trained on or used to generate predictions for such tabular data.

To address, at least in part, the aforementioned issues, embodiments disclosed herein relate to a prediction system that performs knowledge extraction and noise removal for tabular data in order to improve EOL prediction model performance for generating EOL predictions. The prediction system may include a knowledge extractor and noise remover that may: (i) perform data preprocessing on the tabular data to generate processed tabular data, (ii) apply a dimensionality reduction model to the processed tabular data to generate a first loss and reduced tabular data, (iii) apply a tabular attention model to the tabular data and the reduced tabular data to generate a knowledge vector associated with the tabular data, and (iv) provide the knowledge vector to a prediction model to generate a prediction. Additionally, embodiments disclosed herein further relate to generating a custom loss function to update the dimensionality reduction model and the tabular attention model to improve model robustness. Moreover, the prediction model may be one of six prediction models capable of generating six different EOL predictions using the tabular data.

As a result, the prediction system enables multiple traditional prediction models to generate multiple types of EOL predictions associated with tabular data. Therefore, clients associated with organizations may be able to make reliable EOL decisions based on the generated EOL predictions, thereby improving the EOL business of clients.

FIG. 1 shows a diagram a system in accordance with one or more embodiments disclosed herein. The system may include a client (100) and a prediction system (110). The client (100) may provide end of lease (EOL) tabular training data and EOL live tabular data to the prediction system (110), which in turn provides EOL prediction generation services for the client (100). The client (100) may use the predictions to perform further EOL processing or perform EOL actions based on the predictions. For additional information regarding prediction generation services, refer to FIGS. 2A-2B. The components of the system illustrated in FIG. 1 may be operatively connected to each other and/or operatively connected to other entities (not shown) via any combination of wired (e.g., Ethernet) and/or wireless networks (e.g., local area network, wide area network, Internet, etc.) without departing from embodiments disclosed herein. Each component of the system illustrated in FIG. 1A is discussed below.

In one or more embodiments, the client (100) may be implemented using one or more computing devices. A computing device may be, for example, mobile phones, tablet computers, laptop computers, desktop computers, servers, or cloud resources. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described herein and/or all, or a portion, of the methods illustrated in FIGS. 2A-2B. The client (100) may be implemented using other types of computing devices without departing from embodiments disclosed herein. For additional details regarding computing devices, refer to FIG. 4.

In one or more embodiments, the client (100) may be implemented using logical devices without departing from embodiments disclosed herein. For example, the client (100) may include virtual machines that utilize computing resources of any number of physical computing devices to provide the functionality of the client (100). The client (100) may be implemented using other types of logical devices without departing from the embodiments disclosed herein.

In one or more embodiments, the client (100) may include the functionality to, or may be otherwise programmed or configured to, obtain prediction generation services from the prediction system (110). As part of obtaining prediction generation services, the client (100), or users thereof, may provide tabular training data to train models used by the prediction system. The client (100) may further provide live tabular data to the prediction system (110) for prediction generation. In return, the client (100) may obtain EOL predictions associated one or more EOL prediction models used by the prediction system (110). The client (100) may perform additional EOL processing on the EOL predictions or perform EOL actions based on the EOL predictions. The client (100) may include the functionality to perform all, or a portion of, the methods of FIGS. 2A-2B. The client (100) may include other and/or additional functionalities without departing from embodiments disclosed herein.

In one or more embodiments, the prediction system (110) may be implemented using one or more computing devices. A computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions of the prediction system (110) described herein and/or all, or a portion, of the methods illustrated in FIGS. 2A-2B. The prediction system (110) may be implemented using other types of computing devices without departing from the embodiments disclosed herein. For additional details regarding computing devices, refer to FIG. 4.

The prediction system (110) may be implemented using logical devices without departing from the embodiments disclosed herein. For example, the prediction system (110) may include virtual machines that utilize computing resources of any number of physical computing devices to provide the functionality of the prediction system (110). The prediction system (110) may be implemented using other types of logical devices without departing from the embodiments disclosed herein.

In one or more embodiments, the prediction system (110) may include the functionality to, or otherwise be programmed or configured to, perform prediction generation services for the client (100). The prediction system (110) may include the functionality to perform all, or a portion of, the methods discussed in FIGS. 2A-2B. The prediction system (110) may include other and/or additional functionalities without departing from embodiments disclosed herein. For additional information regarding the functionality of the prediction system (110), refer to FIGS. 2A-2B.

To perform the aforementioned functionality of the prediction system (110), the prediction system (110) may include a knowledge extractor and noise remover (KENR) (112), a prediction model manager (120), and storage (124). The prediction system (110) may include other, additional, and/or fewer components without departing from embodiments disclosed herein. Each of the aforementioned components of the prediction system (110) is discussed below.

In one or more embodiments disclosed herein, the KENR (112) is implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the KENR (112) described throughout this Detailed Description.

In one or more embodiments disclosed herein, the KENR (112) is implemented as computer instructions, e.g., computer code, stored on a storage (e.g., storage (124)) that when executed by a processor of the prediction system (110) causes the prediction system (110) to provide the functionality of the KENR (112) described throughout this Detailed Description.

In one or more embodiments, the KENR (112) includes the functionality to, or is otherwise configured to, perform the knowledge extraction and noise removal services of the prediction system (110). The knowledge extraction and noise removal services performed by the KENR (112) may include processing tabular training data and live tabular data to improve the accuracy and reliability of prediction model performance for generating EOL predictions. The KENR (112) may include the functionality to perform all, or a portion thereof, the steps in the methods depicted in FIGS. 2A-2B. The KENR (112) may include, or be configured to perform, other and/or additional functionalities without departing from embodiments disclosed herein. For additional information regarding the functionality of the KENR (112), refer to FIGS. 2A-2B. To perform the knowledge extraction and noise removal services, the KENR (112) may include a tabular attention model (114), a dimensionality reduction model (116), and a loss function controller (118), which each perform a portion of the knowledge extraction and noise removal services of the KENR (112).

In one or more embodiments, the tabular attention model (114) may include the functionality to generate a knowledge vector. In one or more embodiments, the dimensionality reduction model (116) may include the functionality to generate a first loss, reduced tabular training data, and reduced live tabular data. In one or more embodiments, the loss function controller (118) may include the functionality to generate a custom loss function used to update the tabular attention model (114) and the dimensionality reduction model (116) during training. For additional information regarding the functionality of each of the KENR components (114, 116, 118), refer to FIGS. 2A-2B. Each of the aforementioned components (114, 116, 118) may be implemented as computer instructions, which when executed by a processor of the prediction system (110), causes the prediction system (110) to provide the functionality of the components (114, 116, 118).

In one or more embodiments disclosed herein, the predication model manager (120) is implemented as a physical device. The physical device may include circuitry. The physical device may be, for example, a field-programmable gate array, application specific integrated circuit, programmable processor, microcontroller, digital signal processor, or other hardware processor. The physical device may be configured to provide the functionality of the predication model manager (120) described throughout this Detailed Description.

In one or more embodiments disclosed herein, the predication model manager (120) is implemented as computer instructions, e.g., computer code, stored on a storage (e.g., storage (124)) that when executed by a processor of the prediction system (110) causes the prediction system (110) to provide the functionality of the predication model manager (120) described throughout this Detailed Description.

In one or more embodiments, the predication model manager (120) includes the functionality to, or is otherwise configured to, generate EOL predictions using knowledge vectors obtained from the KENR (112). The predication model manager (120) may include one or more prediction models that may be used to generate EOL predictions. The predication model manager (120) may include the functionality to perform all, or a portion thereof, the steps in the methods depicted in FIGS. 2A-2B. The predication model manager (120) may include, or be configured to perform, other and/or additional functionalities without departing from embodiments disclosed herein. For additional information regarding the functionality of the predication model manager (120), refer to FIGS. 2A-2B.

The prediction model manager (120) may include prediction model A (122A) and prediction model E (122E). The prediction models may include classification and/or regression prediction models without departing from embodiments disclosed herein. The prediction models (122A, 122E) may be, for example, neural network prediction models. The predication models (122A, 122E) may include: (i) a disposal type prediction model, (ii) a lag prediction model, (iii) a remarketing revenue prediction model, (iv) a sold in place revenue prediction model, (v) a channel prediction model, and (vi) a renewal prediction model. Each type of EOL prediction model is discussed below.

In one or more embodiments, a disposal type prediction model may generate disposal type predictions that predict the type of disposal associated with a product leased by a customer. The disposal types may include sold in place, give in place, remarketed, and renewed (all discussed above). In one or more embodiments, the lag prediction model may generate predictions that predict the lag associated leased products. The lag may specify the difference between the expected return data and the actual return date and/or the difference between the reference start date and actual return date. Lag is discussed further in FIGS. 2A-2B. In one or more embodiments, the remarketing revenue prediction model may generate predictions specifying the total revenue earned from remarketing returned leased items. In one or more embodiments, the sold in place revenue prediction model may generate predictions specifying the total revenue earned from selling leased products to customers that leased the products. In one or more embodiments, the channel prediction model may generate predictions specifying the channel in which leased products are remarketed. The channels may include the wholesale market, the salvage market, and the direct market. In one or more embodiments, the renewal prediction model may generate predictions specifying the number of leased products that got their leases renewed. The prediction models (122A, 122E) may include other and/or additional types of prediction models without departing from embodiments disclosed herein.

In one or more embodiments, the storage (124) may be implemented using one or more volatile or non-volatile storages or any combination thereof. The storage (124) may include the functionality to, or otherwise be configured to, store and provide information that may be used by the prediction system (110) and the components thereof (e.g., 112, 114, 116, 118, 120) to perform prediction generation services. The information stored in the storage (124) may include tabular training data and live tabular data (both discussed below), and other and/or additional information (e.g., generated predictions, prediction models, etc.) associated with prediction generation services without departing from embodiments disclosed herein.

In one or more embodiments, the tabular training data may one or more data structures (not shown) that may be used to train the dimensionality reduction model (116) and the tabular attention model (114) based on a particular prediction model (e.g., 122A). The tabular training data may include EOL information associated with previously leased products whose leases have ended. For each product, the EOL information may include a product identifier, a customer identifier, lease period (e.g., the start date of the lease and the length of the lease), an expected return date, an actual return date, a disposal type, remarketing channel (if remarketed), remarketed revenue (if remarketed), and sold in place revenue (if sold in place) associated with the product. The tabular training data may include other and/or additional information that may be used for training without departing from embodiments disclosed herein. The tabular training data may be generated by the client (100) and/or a third party entity (not shown) and provided to, or otherwise obtained by, the prediction system (110).

In one or more embodiments, the live tabular data may include one or more data structures that include live EOL information associated with currently leased products that may be used to generate EOL predictions for the client (100). For each currently leased product, the live EOL information may include a product identifier, a customer identifier, lease period (e.g., the start date of the lease and the length of the lease), and an expected return date. The live tabular data may include other and/or additional information without departing from embodiments disclosed herein. The live tabular data may be generated by the client (100) and/or a third party entity (not shown) and provided to, or otherwise obtained by, the prediction system (110).

While the aforementioned data structures have been discussed as separate data structures and have been discussed as including a limited amount of specific information, any of the aforementioned data structures may be divided into any number of data structures, combined with any number of other data structures, and may include additional, less, and/or different information without departing from embodiments disclosed herein. Additionally, while being discussed as being stored in the storage (124), any of the aforementioned data structures may be stored in different locations (e.g., in storage of other computing devices) and/or spanned across any number of computing devices without departing from embodiments disclosed herein. The data structures discussed throughout this Detailed Disclosure may be implemented using, for example, lists, linked lists, tables, unstructured data, databases, etc.

Although the system of FIG. 1A is shown as having a certain number of components (e.g., 100, 110, 112, 122, 124), in other embodiments disclosed herein, the system may have more or fewer components. For example, the functionality of each component described above may be split across components or combined into a single component. Further still, each component may be utilized multiple times to carry out an iterative training operations and/or multiple prediction generations.

Figure 2A:
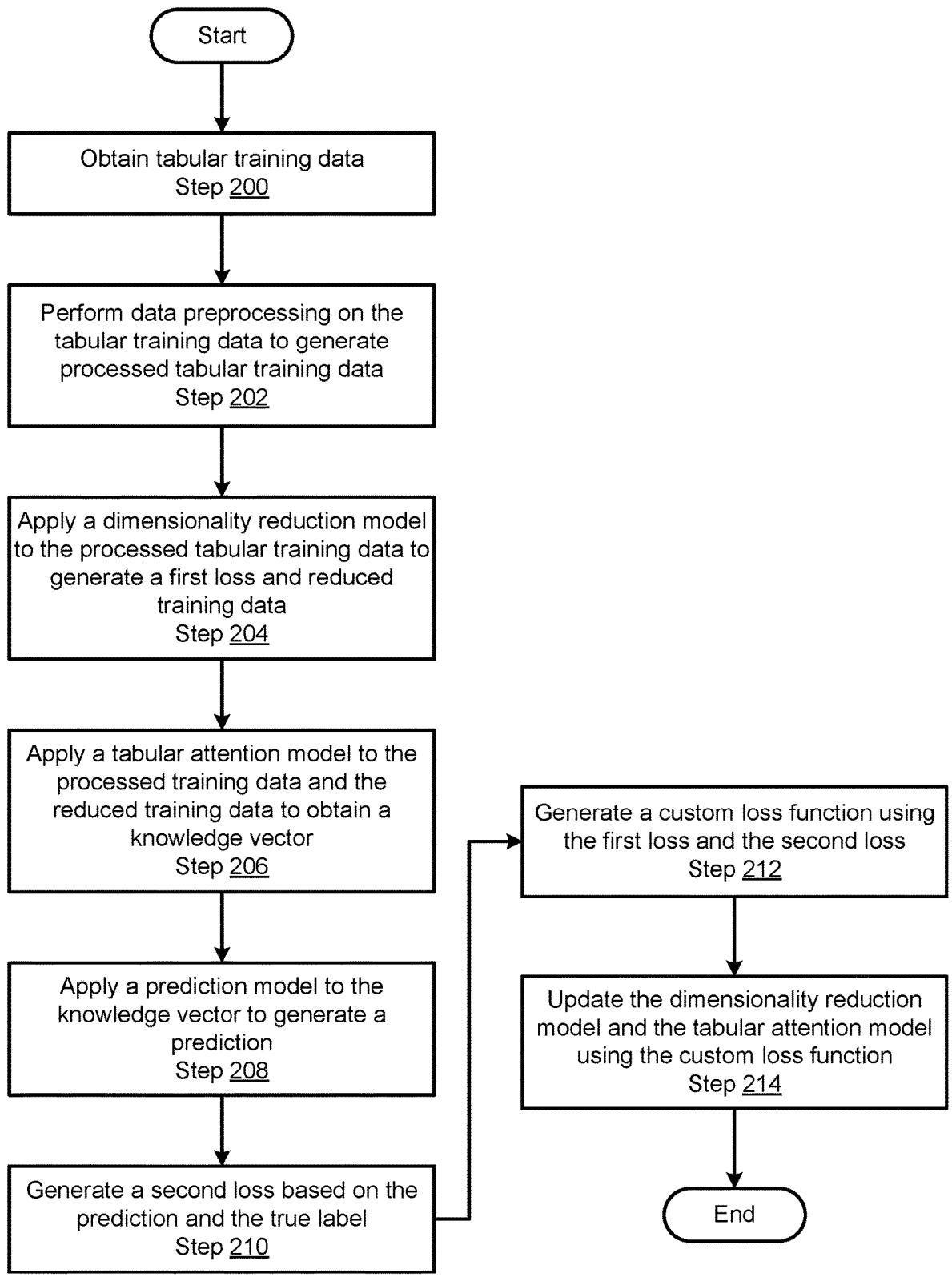
FIG. 2A shows a flowchart of a method for training a knowledge extractor and noise remover of a prediction system in accordance with one or more embodiments disclosed herein.

FIG. 2A shows a flowchart of a method for training a knowledge extractor and noise remover of a prediction system in accordance with one or more embodiments disclosed herein. The method of FIG. 2A may be performed by, for example, the prediction system (e.g., 110, FIG. 1). Other components of the system illustrated in FIG. 1 may perform all, or a portion, of the method of FIG. 2A without departing from the scope of the embodiments disclosed herein.

While FIG. 2A is illustrated as a series of steps, any of the steps may be omitted, performed in a different order, additional steps may be included, and/or any or all of the steps may be performed in a parallel and/or partially overlapping manner without departing from the scope of the embodiments described herein.

Turning to FIG. 2A, in Step 200, tabular training data is obtained. In one or more embodiments, the client provides the tabular training data to the prediction system. The client may provide the tabular training data using any appropriate method of data transmission without departing from embodiments disclosed herein. For example, the client may send all a portion of the tabular training data as a message including one or network packets through one or more network devices that operatively connect the client to the prediction system. In other embodiments, the may share the tabular training data using a shared storage (e.g., a network file system) with the prediction system. In yet other embodiments, the client may provide access information (e.g., network address, security keys, digital certificates, permissions, etc.) that the prediction system may use to access (e.g., download) the tabular training data. The tabular training data may be obtained via other and/or additional methods without departing from embodiments disclosed herein.

In Step 202, data preprocessing is performed on the tabular training data to generate processed tabular training data. For example, the tabular training data may include one or more data value types associated with dates (e.g., expected return dates, actual return dates, etc.). The predictions generated by the prediction models may use the dates in the tabular training data to generate forecasts associated with periods that include a reference start date (e.g., the start of the fiscal year). However, tabular training data may include date data values that are inconsistent with the reference start date of the forecasts (e.g., fall before the start date). Additionally, expected date of return and actual date of return may vary resulting in positive lag (e.g., the actual date of return is greater than the expected date of return) and negative lag (e.g., the actual date of return is less than the expected date of return). Positive lag occurs when a customer returns a leased product after the expected return date, and negative lag occurs when a customer returns a leased product before the expected date of return. As a result, forecasting and prediction generation inconsistencies may occur. The KENR may data preprocessing to identify the lags and the lags with respect to the reference start date (e.g., the difference between the actual date of return and the reference start date) included in the tabular data for generating lag predictions.

Additionally, the data preprocessing may include time normalization. To perform time normalization, the KENR may adjust predicted date of return for date data values included in the tabular training data based on lag, the reference start date associated with the prediction or the forecast, and the expected return date. For a particular product, if the reference start date is greater than the expected return date, the KENR may set the predicted date of return to the reference start date plus the lag. Moreover, if the reference start date is less than the expected return date, then the KENR may set the predicted date of return to the expected return date plus the lag. The resulting data may be referred to as the processed tabular training data.

The KENR may perform other types of data preprocessing without departing from embodiments disclosed herein. Data preprocessing may be performed on the tabular training data to generate processed tabular training data via other and/or additional methods without departing from embodiments disclosed herein.

In Step 204, a dimensionality reduction model is applied to the processed tabular training data to generate a first loss and reduced training data. In one or more embodiments, the processed training data may include a large quantity of dimensions (e.g., columns of different types of data). The KENR may apply the dimensionality reduction model to the processed training data to generate reduced training data. The dimensionality reduction model may include two neural networks that are each perform dimensionality reduction (e.g., compression) of the input tabular training data. The tabular training data may be inputted into the first neural network, which performs a first dimensionality reduction operation to output a half-reduced training data. The half-reduced training data may be inputted into a second neural network which performs a second dimensionality reduction operation to output reduced training data. The dimensionality reduction operations compress the inputted data to encode or otherwise reduce the dimensions of the inputted data such that the outputted data includes relevant information (e.g., unnecessary information is removed) that may be used for prediction generation services.

In one or more embodiments, the dimensionality reduction model includes two other neural networks that performs reconstruction operations during KENR training operations. The KENR may input a copy of the reduced training data in the third neural network, which performs a reconstruction operation to output half-reconstructed training data. The KENR may input a copy of the half-reconstructed training data in the fourth neural network, which performs a reconstruction operation to output reconstructed training data. The reconstruction operations attempt to reconstruct the reduced training data to match the original processed training data.

In one or more embodiments, the KENR may then compare a copy of the original processed training data with the reconstructed training data to generate a first loss. The first loss may be the difference, or error, between the original processed training data and the reconstructed training data. The first loss may be used to update the four neural networks to improve the accuracy of the dimensionality reduction operations and the reconstruction operations, and therefore, improve the quality of the reduced training data.

The dimensionality reduction model may be applied to the processed tabular training data to generate the first loss and reduced training data via other and/or additional methods without departing from embodiments disclosed herein.

In Step 206, a tabular attention model is applied to the processed training data and the reduced training data to obtain a knowledge vector. In one or more embodiments, the KENR may input both the original processed training data and the reduced training data generated using the dimensionality reduction model in Step 204 into the tabular attention model. The tabular attention model may include three different neural networks. The first two neural networks may perform dimensionality reduction operations on separate copies of the processed training data to generate first half-reduced training data and second half-reduced training data. The two neural networks may include different parameters (e.g., neural network weights) such that the first half-reduced training data is different than the second half-reduced training data.

In one or more embodiments, the KENR may apply the reduced training data to a third neural network of the tabular attention model, which performs another dimensionality reduction operation on the reduced training data to generate second reduced training data.

In one or more embodiments, the KENR may perform a dot product operation between the first half-reduced training data and the second reduced training data. The KENR may then perform normalization on the resulting vector from the dot product to generate a score vector. The KENR may use any appropriate method of normalization (e.g., standard normalization, softmax normalization, etc.) to generate the score vector without departing from embodiments disclosed herein. The score vector may include normalized data values (e.g., data values between zero and one). In one or more embodiments, the KENR may perform an element-wise product operation between the score vector and the second reduced training data to generate the knowledge vector. The knowledge vector may include dimensionally reduced and weighted training data. The knowledge vector may enable accurate prediction generation associated with large tabular data by a prediction model.

The tabular attention model may be applied to the processed training data and the reduced training data to obtain a knowledge vector via other and/or additional methods without departing from embodiments disclosed herein.

In Step 208, a prediction model is applied to the knowledge vector to generate a prediction. In one or more embodiments, the KENR provides the knowledge vector to the prediction model manager. In response to obtaining the knowledge vector, the prediction model manager may apply a prediction model to the knowledge vector to generate a prediction. The prediction model may be one of the EOL prediction models discussed above. As a result, the prediction may be one of the EOL predictions associated with the EOL prediction model. A prediction model may be applied to the knowledge vector via other and/or additional methods without departing from embodiments disclosed herein.

In Step 210, a second loss is generated based on the prediction and a true label. In one or more embodiments, the tabular training data may include a true label. The true label may refer to the real value or target value that the prediction model attempts to match with the generated prediction. The KENR may compare the prediction with the true label to generate a second loss. The second loss may be generated by taking the difference or the error between the true label and the prediction. The second loss may be generated based on the prediction and the true label via other and/or additional methods without departing from embodiments disclosed herein.

In Step 212, a custom loss function is generated using the first loss and the second loss. In one or more embodiments, the loss function controller of the KENR may add together the first loss and the second loss to generate the total loss function. The loss function controller may assign a configurable parameter to the portion of the total loss function associated with the non-drifted data (e.g., current or prior data used to train the KENR models) and one minus the configurable parameter to the portion of the total loss function associated with drifted data (e.g., changed data or data perturbations) to generate the custom loss function. The configurable parameter may specify the weight associated with the portion of the custom loss function associated with non-drifted data and the corresponding weight associated with the portion of the custom loss function associated with drifted data. The custom loss function may be generated using the first loss and the second loss via other loss via other and/or additional methods without departing from embodiments disclosed herein.

In Step 214, the dimensionality reduction model and the tabular attention model are updated using the custom loss function. In one or more embodiments, the KENR may update the neural network parameters (e.g., neural network weights) of the neural networks included in the dimensionality reduction model and the tabular attention model based on the custom loss function. The neural network parameters may be updated during training to minimize the custom loss function. By updating the dimensionality reduction model and the tabular attention model using the custom loss function that includes both a non-drifted data component and a drifted-data component, the robustness and the resiliency to data drift of the updated dimensionality reduction model and the updated tabular attention model may be improved. The dimensionality reduction model and the tabular attention model may be updated using the custom loss function via other and/or additional methods without departing from embodiments disclosed herein.

In one or more embodiments disclosed herein, the method ends following Step 214.

Figure 2B:
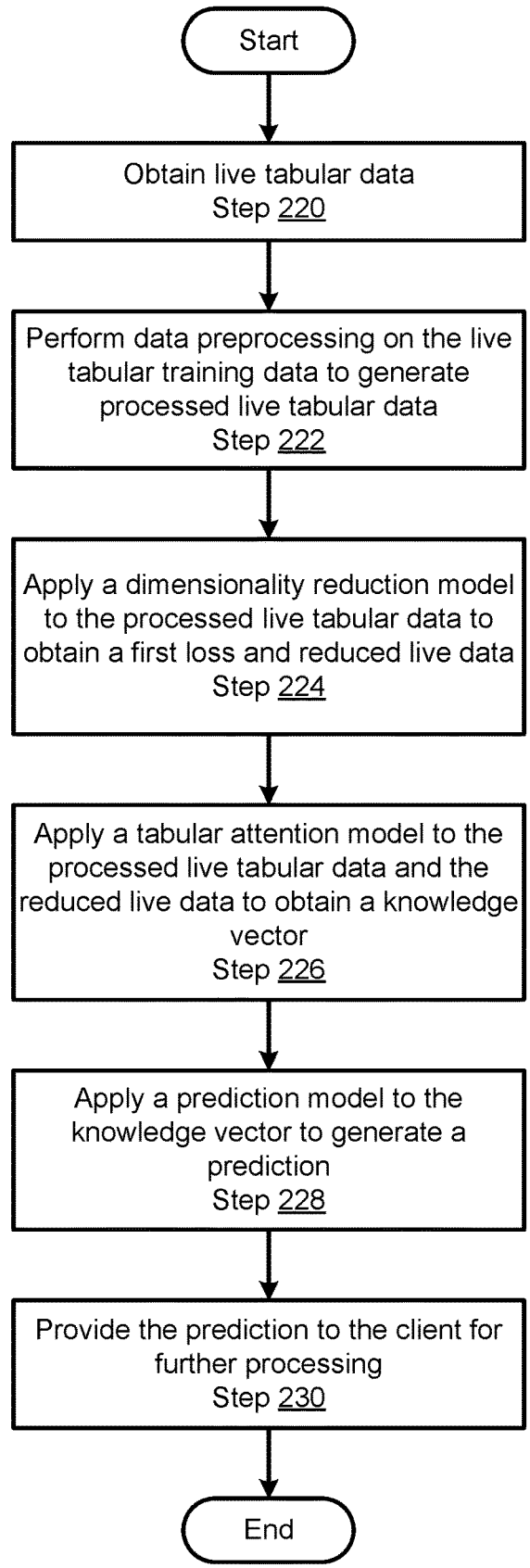
FIG. 2B shows a flowchart of a method for generating a prediction using a knowledge extractor and noise remover in accordance with one or more embodiments disclosed herein.

FIG. 2B shows a flowchart of a method for training a knowledge extractor and noise remover of a prediction system in accordance with one or more embodiments disclosed herein. The method of FIG. 2B may be performed by, for example, the prediction system (e.g., 110, FIG. 1). Other components of the system illustrated in FIG. 1 may perform all, or a portion, of the method of FIG. 2B without departing from the scope of the embodiments disclosed herein.

While FIG. 2B is illustrated as a series of steps, any of the steps may be omitted, performed in a different order, additional steps may be included, and/or any or all of the steps may be performed in a parallel and/or partially overlapping manner without departing from the scope of the embodiments described herein.

Turning to FIG. 2B, in Step 220, live tabular data is obtained. In one or more embodiments, the client provides the live tabular data to the prediction system. The client may provide the live tabular data using any appropriate method of data transmission without departing from embodiments disclosed herein. For example, the client may send all a portion of the live tabular data as a message including one or network packets through one or more network devices that operatively connect the client to the prediction system. In other embodiments, the may share the live tabular data using a shared storage (e.g., a network file system) with the prediction system. In yet other embodiments, the client may provide access information (e.g., network address, security keys, digital certificates, permissions, etc.) that the prediction system may use to access (e.g., download) the live tabular data. The live tabular data may be obtained via other and/or additional methods without departing from embodiments disclosed herein.

In Step 222, data preprocessing is performed on the live tabular data to generate processed live tabular data. Data preprocessing may be performed on the live tabular data via the methods discussed above in Step 202 of FIG. 2A.

In Step 224, a dimensionality reduction model is applied to the processed live tabular data to generate reduced live data. In one or more embodiments, the processed training data may include a large quantity of dimensions (e.g., columns of different types of data). The KENR may apply the dimensionality reduction model to the processed live tabular data to generate reduced live data. The dimensionality reduction model may include two neural networks that are each perform dimensionality reduction (e.g., compression) of the input processed tabular live data. The processed tabular live data may be inputted into the first neural network, which performs a first dimensionality reduction operation to output a half-reduced live data. The half-reduced live data may be inputted into a second neural network which performs a second dimensionality reduction operation to output reduced live data. The dimensionality reduction operations compress the inputted data to encode or otherwise reduce the dimensions of the inputted data such that the outputted data includes relevant information (e.g., unnecessary information is removed) that may be used for prediction generation services.

The dimensionality reduction model may be applied to the processed live tabular data to generate the reduced live data via other and/or additional methods without departing from embodiments disclosed herein.

In Step 226, a tabular attention model is applied to the processed live tabular data and the reduced live data to obtain a knowledge vector. In one or more embodiments, the KENR may input both the original processed live tabular data and the reduced live data generated using the dimensionality reduction model in Step 224 into the tabular attention model. The tabular attention model may include three different neural networks. The first two neural networks may perform dimensionality reduction operations on separate copies of the processed live data to generate first half-reduced live data and second half-reduced live data. The two neural networks may include different parameters (e.g., neural network weights) such that the first half-reduced live data is different than the second half-reduced live data.

In one or more embodiments, the KENR may apply the reduced live data to a third neural network of the tabular attention model, which performs another dimensionality reduction operation on the reduced live data to generate second reduced live data.

In one or more embodiments, the KENR may perform a dot product operation between the first half-reduced live data and the second reduced live data. The KENR may then perform normalization on the resulting vector from the dot product to generate a score vector. The KENR may use any appropriate method of normalization (e.g., standard normalization, softmax normalization, etc.) to generate the score vector without departing from embodiments disclosed herein. The score vector may include normalized data values (e.g., data values between zero and one). In one or more embodiments, the KENR may perform an element-wise product operation between the score vector and the second reduced live data to generate the knowledge vector. The knowledge vector may include dimensionally reduced and weighted live data. The knowledge vector may enable accurate prediction generation associated with large tabular data by a prediction model.

The tabular attention model may be applied to the processed live tabular data and the reduced live data to obtain a knowledge vector via other and/or additional methods without departing from embodiments disclosed herein.

In Step 228, a prediction model is applied to the knowledge vector to generate a prediction. In one or more embodiments, the KENR provides the knowledge vector to the prediction model manager. In response to obtaining the knowledge vector, the prediction model manager may apply a prediction model to the knowledge vector to generate a prediction. The prediction model may be one of the EOL prediction models discussed above. As a result, the prediction may be one of the EOL predictions associated with the EOL prediction model. A prediction model may be applied to the knowledge vector via other and/or additional methods without departing from embodiments disclosed herein.

In Step 230, the prediction is provided to the client for further processing. In one or more embodiments, the prediction system provides the prediction to the client. The prediction system may provide the prediction using any appropriate method of data transmission without departing from embodiments disclosed herein. For example, the prediction system may send all a portion of the prediction as a message including one or network packets through one or more network devices that operatively connect the client to the prediction system. In response to obtaining the prediction, the client may perform further processing using the prediction. The further processing may include making EOL business decisions based on the prediction. The further procession may include other and/or additional actions performed by the client using, or based on, the prediction without departing from embodiments disclosed herein. The prediction may be provided to the client for further processing via other and/or additional methods without departing from embodiments disclosed herein.

In one or more embodiments disclosed herein, the method ends following Step 210.

Figure 3A:
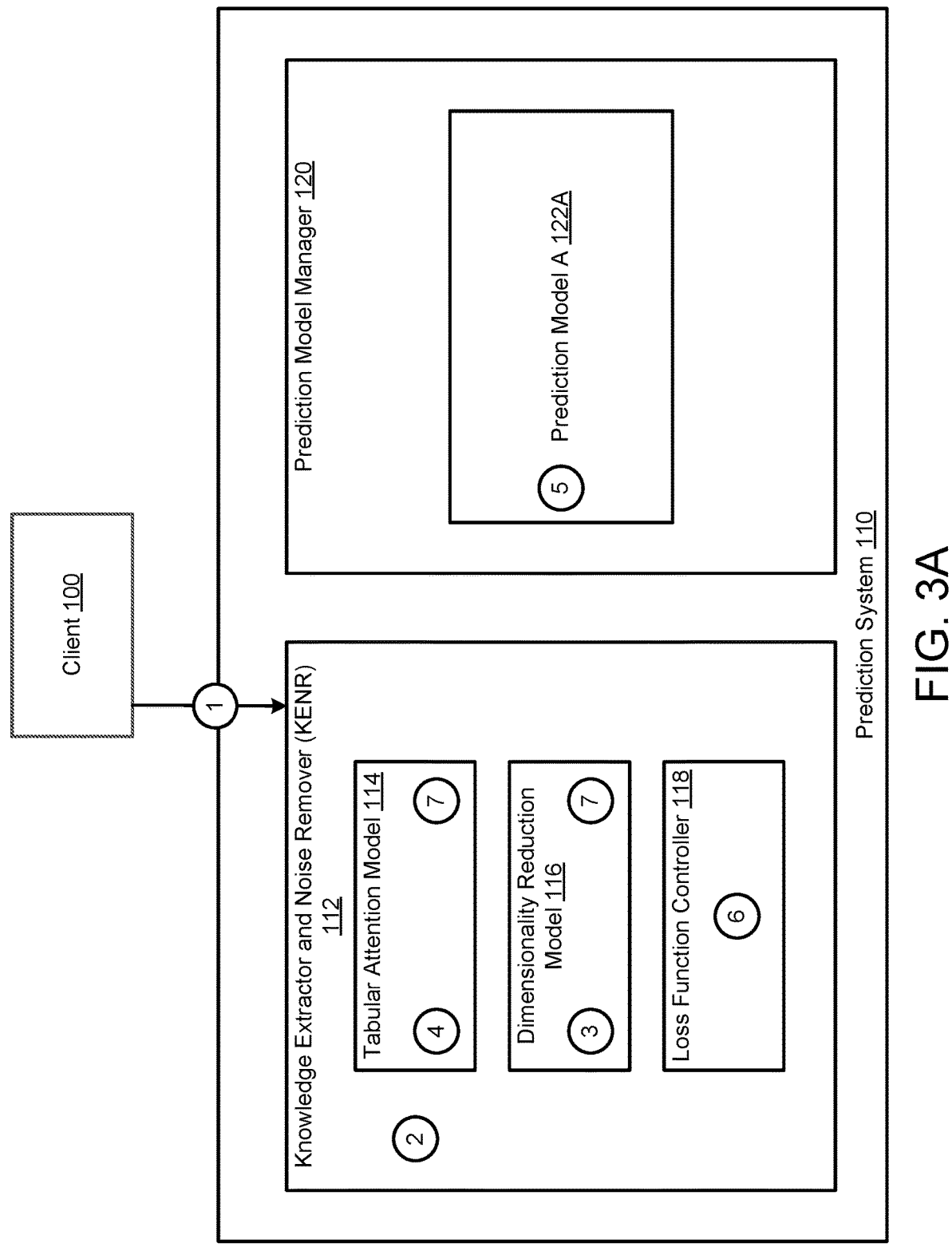
FIGS. 3A-3B show diagrams of the operation of an example system over time in accordance with one or more embodiments disclosed herein.
Figure 3B:
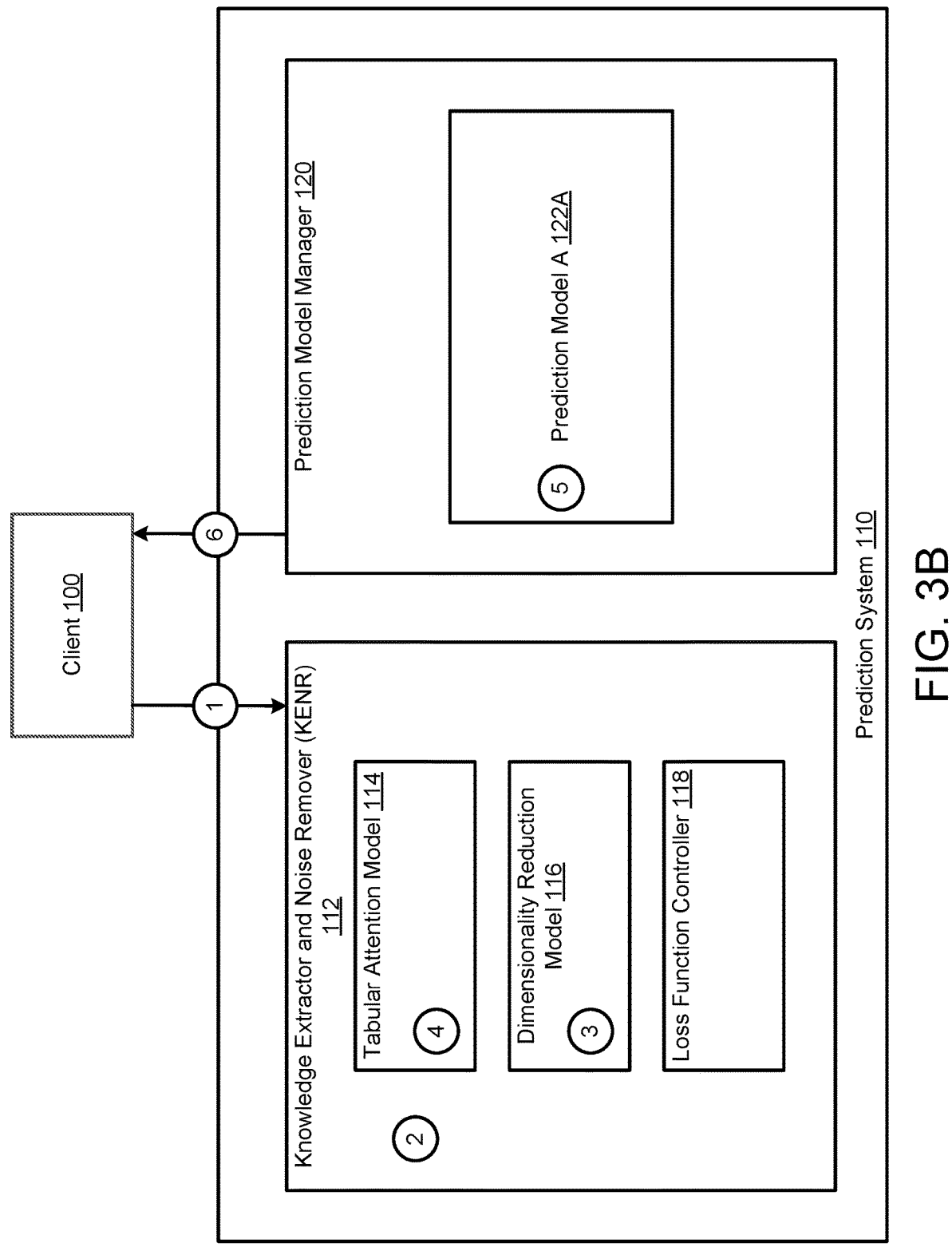

To further clarify embodiments disclosed herein, a non-limiting example is provided in FIGS. 3A-3B show diagrams of the operation of an example system over time in accordance with one or more embodiments disclosed herein. FIGS. 3A-3B show an example system similar to that illustrated in FIG. 1. Actions performed by components of the illustrated system are illustrated by numbered, circular boxes interconnected, in part, using arrowed lines. For the sake of brevity, only a limited number of components of the system of FIG. 1 are illustrated in FIGS. 3A-3B.

Example

Consider a scenario as illustrated in FIG. 3A in which a client (100), at step 1, sends tabular training data to the KENR (112) of a prediction system (110). In response to obtaining the tabular training data, at Step 2, the KENR (112) performs data preprocessing on the tabular training data to generate processed tabular training data. The data preprocessing includes performing time normalization. Then, at Step 3, the KENR (112) applies a dimensionality reduction model (116) to the processed tabular training data to generate a first loss and reduced training data. After that, at Step 4, the KENR (112) applies a tabular attention model (114) to the processed training data and the reduced training data to generate a knowledge vector. After generation of the knowledge vector, the KENR (112) provides the knowledge vector to the prediction model manager (120).

Then, at Step 5, the prediction model manager (120) applies prediction model A (122A) to the knowledge vector to generate a prediction. Prediction model A (122) is a disposal type prediction model and the prediction specifies predicted disposal types associated with the products included in the tabular training data. After generating the prediction, the loss function controller (118) may generate a second loss using the prediction and the true label. The second loss may specify the difference, or error, between the disposal type predictions included in the prediction and the corresponding real disposal types specified by the true label. At Step 6, the loss function controller (118) then generates a custom loss function using the first loss and the second loss. Finally, at Step 7, the KENR (112) updates the dimensionality reduction model and the tabular attention model using the custom loss function.

Turning to FIG. 3B, consider a scenario in which a client (100) sends live tabular data to the KENR (112) of a prediction system (110). In response to obtaining the live tabular data, at Step 2, the KENR (112) performs data preprocessing on the live tabular data to generate processed live tabular data. The data preprocessing includes performing time normalization. Then, at Step 3, the KENR (112) applies a dimensionality reduction model (116) to the processed live tabular data to generate a first loss and reduced live data. After that, at Step 4, the KENR (112) applies a tabular attention model (114) to the processed live data and the reduced live data to generate a knowledge vector. After generation of the knowledge vector, the KENR (112) provides the knowledge vector to the prediction model manager (120).

Then, at Step 5, the prediction model manager (120) applies prediction model A (122A) to the knowledge vector to generate a prediction. Prediction model A (122) is a disposal type prediction model and the prediction specifies predicted disposal types associated with the products included in the live tabular data. Finally, at Step 6, the prediction model manager (120) of the prediction system provides the prediction to the client (100). The client (100) then performs EOL actions based on the prediction.

End of Example

Figure 4:
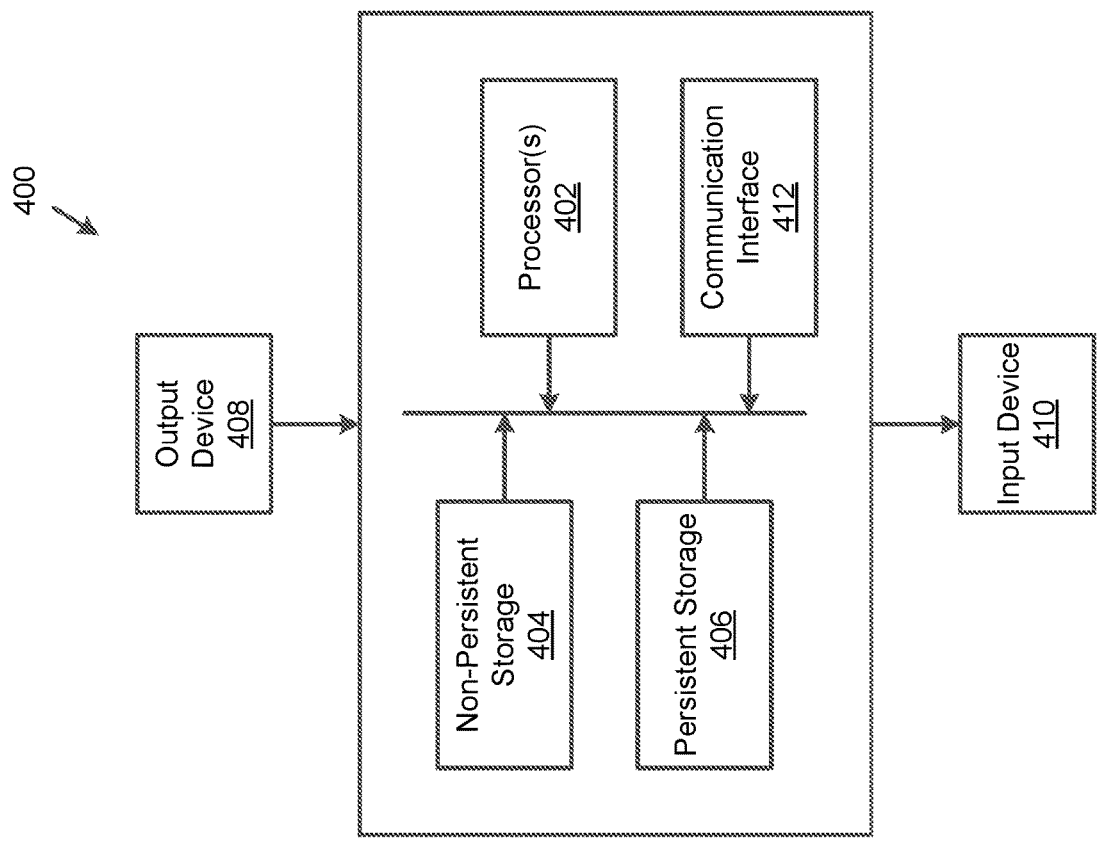
FIG. 4 shows a diagram of a computing device in accordance with one or more embodiments disclosed herein.

As discussed above, embodiments disclosed herein may be implemented using computing devices. FIG. 4 shows a diagram of a computing device in accordance with one or more embodiments disclosed herein. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment disclosed herein, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment disclosed herein, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

On of ordinary skill in the relevant art will appreciate that embodiments disclosed herein may be applied to other types of prediction generation services associated with tabular data (e.g., big data) besides EOL prediction generation services without departing from embodiments disclosed herein.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an entity that is programmed to or configured to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

The problems discussed above should be understood as being examples of problems solved by embodiments disclosed herein and the embodiments disclosed herein should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While the embodiments disclosed herein have been described above with respect to a limited number of embodiments, those skilled in the art, having the benefit of this disclosure, will appreciate that other embodiments can be devised which do not depart from the scope of the embodiments disclosed herein as of the embodiments disclosed herein. Accordingly, the scope of the embodiments disclosed herein should be limited only by the attached claims.

What is claimed is:

1. A method for performing knowledge extraction and noise removal for prediction models, comprising:
    obtaining, by a prediction system, live tabular data;
    in response to obtaining live tabular data:
        performing data preprocessing on the live tabular data to generate processed live tabular data;
        generating a knowledge vector based on the processed live tabular data using a dimensionality reduction model and a tabular attention model;
        generating a prediction using a prediction model and the knowledge vector; and
        providing the prediction to a client, wherein the client performs prediction processing using the prediction.

2. The method of claim 1, wherein:
    the dimensionality reduction model comprises a first plurality of neural networks; and
    the tabular attention model comprises a second plurality of neural networks.

3. The method of claim 2, further comprising:
    prior to obtaining the live tabular data:
        obtaining tabular training data;
        in response to obtaining the tabular training data:
            performing data preprocessing on the tabular training data to generate processed tabular training data;
            generating a second knowledge vector based on the processed tabular training data using the dimensionality reduction model and the tabular attention model;
            generating a second prediction using a prediction model and the second knowledge vector;
            generating a custom loss function based the second prediction; and
            updating the dimensionality reduction model and the tabular attention model based on the custom loss function.

4. The method of claim 3, wherein updating the dimensionality reduction model and the tabular attention model based on the custom loss function comprises:
    updating the first plurality of neural networks based on the custom loss function; and
    updating the second plurality of neural networks based on the custom loss function.

5. The method of claim 3, wherein generating the knowledge vector based on the processed tabular training data using a dimensionality reduction model and a tabular attention model comprises:
    applying the dimensionality reduction model to the processed tabular training data to obtain a first loss and reduced training data; and
    applying the tabular attention model to the processed tabular training data and the reduced training data to generate the knowledge vector.

6. The method of claim 5, wherein generating the custom loss function based on the prediction comprises:
    generating a second loss based on the prediction and a true label associated with the tabular training data; and
    combining the first loss and the second loss.

7. The method of claim 1, wherein the prediction model comprises one selected from a group consisting of:
   a classification prediction model; and
   a regression prediction model.

8. A non-transitory computer readable medium comprising computer readable program code, which when executed by a computer processor enables the computer processor to perform a method for performing knowledge extraction and noise removal for prediction models, the method comprising:
   obtaining, by a prediction system, live tabular data;
   in response to obtaining live tabular data:
      performing data preprocessing on the live tabular data to generate processed live tabular data;
      generating a knowledge vector based on the processed live tabular data using a dimensionality reduction model and a tabular attention model;
      generating a prediction using a prediction model and the knowledge vector; and
      providing the prediction to a client, wherein the client performs prediction processing using the prediction.

9. The non-transitory computer readable medium of claim 8, wherein:
   the dimensionality reduction model comprises a first plurality of neural networks; and
   the tabular attention model comprises a second plurality of neural networks.

10. The non-transitory computer readable medium of claim 9, further comprising:
   prior to obtaining the live tabular data:
      obtaining tabular training data;
      in response to obtaining the tabular training data:
         performing data preprocessing on the tabular training data to generate processed tabular training data;
         generating a second knowledge vector based on the processed tabular training data using the dimensionality reduction model and the tabular attention model;
         generating a second prediction using a prediction model and the second knowledge vector;
         generating a custom loss function based the second prediction; and
         updating the dimensionality reduction model and the tabular attention model based on the custom loss function.

11. The non-transitory computer readable medium of claim 10, wherein updating the dimensionality reduction model and the tabular attention model based on the custom loss function comprises:
   updating the first plurality of neural networks based on the custom loss function; and
   updating the second plurality of neural networks based on the custom loss function.

12. The non-transitory computer readable medium of claim 10, wherein generating the knowledge vector based on the processed tabular training data using a dimensionality reduction model and a tabular attention model comprises:
   applying the dimensionality reduction model to the processed tabular training data to obtain a first loss and reduced training data; and
   applying the tabular attention model to the processed tabular training data and the reduced training data to generate the knowledge vector.

13. The non-transitory computer readable medium of claim 12, wherein generating the custom loss function based on the prediction comprises:
   generating a second loss based on the prediction and a true label associated with the tabular training data; and
   combining the first loss and the second loss.

14. The non-transitory computer readable medium of claim 8, wherein the prediction model comprises one selected from a group consisting of:
   a classification prediction model; and
   a regression prediction model.

15. A system for performing knowledge extraction and noise removal for prediction models, comprising:
   a client; and
   a prediction system, comprising a processor and memory, programmed to:
      obtain live tabular data;
      in response to obtaining live tabular data:
         perform data preprocessing on the live tabular data to generate processed live tabular data;
         generate a knowledge vector based on the processed live tabular data using a dimensionality reduction model and a tabular attention model;
         generate a prediction using a prediction model and the knowledge vector; and
         provide the prediction to the client, wherein the client performs prediction processing using the prediction.

16. The system of claim 15, wherein:
   the dimensionality reduction model comprises a first plurality of neural networks; and
   the tabular attention model comprises a second plurality of neural networks.

17. The system of claim 16, wherein the prediction system is further programmed to:
   prior to obtaining the live tabular data:
      obtain tabular training data;
      in response to obtaining the tabular training data:
         perform data preprocessing on the tabular training data to generate processed tabular training data;
         generate a second knowledge vector based on the processed tabular training data using the dimensionality reduction model and the tabular attention model;
         generate a second prediction using a prediction model and the second knowledge vector;
         generate a custom loss function based the second prediction; and
         update the dimensionality reduction model and the tabular attention model based on the custom loss function.

18. The system of claim 17, wherein updating the dimensionality reduction model and the tabular attention model based on the custom loss function comprises:
   updating the first plurality of neural networks based on the custom loss function; and
   updating the second plurality of neural networks based on the custom loss function.

19. The system of claim 17, wherein generating the knowledge vector based on the processed tabular training data using a dimensionality reduction model and a tabular attention model comprises:
   applying the dimensionality reduction model to the processed tabular training data to obtain a first loss and reduced training data; and
   applying the tabular attention model to the processed tabular training data and the reduced training data to generate the knowledge vector.

20. The system of claim 19, wherein generating the custom loss function based on the prediction comprises:

generating a second loss based on the prediction and a true label associated with the tabular training data; and combining the first loss and the second loss.

\* \* \* \* \*